United States Patent
Sträussnigg et al.

(10) Patent No.: US 7,027,592 B1
(45) Date of Patent: Apr. 11, 2006

(54) NON-LINEAR ECHO CANCELLATION IN DISCRETE MULTI-TONE SYSTEMS

(75) Inventors: Dietmar Sträussnigg, Villach (AT); Manfred Kogler, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/914,417

(22) PCT Filed: Mar. 1, 2000

(86) PCT No.: PCT/DE00/00625

§ 371 (c)(1),
(2), (4) Date: Dec. 18, 2001

(87) PCT Pub. No.: WO00/52844

PCT Pub. Date: Sep. 8, 2000

(30) Foreign Application Priority Data

Mar. 1, 1999 (DE) .......................................... 199 08 814

(51) Int. Cl.
*H04M 1/00* (2006.01)

(52) U.S. Cl. .............................. 379/406.08; 379/406.12
(58) Field of Classification Search ............ 379/406.01, 379/406.08, 406.09; 370/286
See application file for complete search history.

(56) References Cited

U.S. PATENT DOCUMENTS

| | | | |
|---|---|---|---|
| 3,647,992 A | 3/1972 | Thomas | 179/170.2 |
| 4,792,915 A | 12/1988 | Adams et al. | |
| 5,317,596 A * | 5/1994 | Ho et al. | 379/406.09 |
| 5,778,055 A | 7/1998 | Paneth et al. | 379/93.31 |
| 5,787,113 A | 7/1998 | Chow et al. | |
| 6,181,714 B1 | 1/2001 | Isaksson et al. | |
| 6,574,336 B1 | 6/2003 | Kirla | |
| 6,687,235 B1 * | 2/2004 | Chu | 379/406.01 |

FOREIGN PATENT DOCUMENTS

EP  0 498 369 A2  8/1992

OTHER PUBLICATIONS

Japanese Office Action dated Oct. 22, 2004.

* cited by examiner

*Primary Examiner*—Forester W. Isen
*Assistant Examiner*—Jefferey Harold
(74) *Attorney, Agent, or Firm*—Fish & Richardson P.C.

(57) ABSTRACT

A circuit arrangement for two-wire/four-wire conversion in a DMT system, which is connected to a digital reception path, a digital transmission path and also an analog transmission/reception path and which has nonlinear echo cancellation in the time domain of a signal and also linear echo cancellation in the frequency domain of the signal, furthermore comprises a device for adaptation of the non-linearities in the frequency domain.

21 Claims, 1 Drawing Sheet

NON-LINEAR ECHO CANCELLATION IN DISCRETE MULTI-TONE SYSTEMS

DESCRIPTION

Circuit arrangement for two-wire/four-wire conversion in a DMT system with nonlinear echo cancellation.

FIELD OF INVENTION

The present invention relates to a circuit arrangement for two-wire/four-wire conversion in a discrete multi-tone system.

BACKGROUND

U.S. Pat. No. 3,647,992 discloses a circuit arrangement for two-wire/four-wire conversion in a DMT system, which is connected to a digital reception path, a digital transmission path and also an analog transmission/reception path and which has nonlinear echo cancellation in the time domain and also has a device for adaptation of the nonlinear echo cancellation in the frequency domain.

U.S. Pat. No. 5,778,055 discloses nonlinear echo cancellation in connection with an analog telephone system.

U.S. Pat. No. 5,317,596 describes a method and a device for echo cancellation in the case of a signal generated by discrete multitone modulation. As is known, full-duplex data transmission is the simultaneous transmission of data in two opposite directions with partly overlapping frequency bands. In this case, an echo occurs as a result of a signal to be transmitted crossing into the receiver situated at the same location, as a result of which a signal received by the remote end is superposed and corrupted. By way of example, an echo occurs in a telephone network if the signal transmitted by a user passes through the hybrid circuit into the receiver of the user. This hybrid circuit may also be referred to as an echo channel. Such an echo channel can be modeled by a finite number of parameters. Therefore, an echo canceler first estimates the parameters and then linearly convolves the estimation with the transmitted signal, as a result of which the echo is emulated. The emulated echo signal thus obtained is then subtracted from the received signal, whereby the pure signal is produced in the ideal case.

Echo principally occurs owing to inexactly matched impedances at the hybrid connectors. Since the impedances of the transmission lines are time-dependent and line-dependent, the echo canceler must be adaptive. Furthermore, it is possible to carry out echo cancellation both in the time domain and in the frequency domain of a signal.

In multicarrier modulation, the data to be transmitted are transmitted by the binary digital data that are to be transmitted first being arranged in sub-blocks. These sub-blocks are then combined to form blocks or fixed length which are then in each case modulated onto a carrier and transmitted. Discrete multi-tone modulation is a form of multicarrier modulation which is used in digital signal processing, an IFFT/FFT pair being used as modulation/demodulation vector.

In the US patent specification mentioned, the echo cancellation is performed both in the time domain and in the frequency domain of a signal. What is disadvantageous is that only linear echo cancellation is performed, so that complete echo cancellation is not achieved.

Furthermore, methods are known in which the cancellation of the nonlinear echo signal is effected in the time domain and the attenuation of the linear echo signal is preferably effected in the frequency domain. This gives rise to difficulties in the adaptation due to slow transient recovery and convergence problems.

Furthermore, WO 98/32241 describes a circuit arrangement for two-wire/four-wire conversion, in which digital signals of a digital reception path are converted and coupled via a hybrid onto an analog transmission/reception path and analog signals of the analog transmission/reception path are digitized and coupled onto a digital transmission path, echo suppression being connected between the digital transmission and reception paths. In this case, an echo estimation filter is used to adaptively approximate the behavior of the hybrid circuit and of the analog transmission/reception path. In this case, the echo cancellation is effected both in the frequency domain and in the time domain of the signals, which causes difficulties in the adaptation.

SUMMARY

The invention is based on the object, therefore, of developing effective echo cancellation in systems with multicarrier modulation with orthogonal subchannels.

In the invention's method and device for attenuating nonlinear echo signals in a circuit arrangement for two-wire/four-wire conversion with multicarrier modulation with orthogonal subchannels, for example "Discrete Multitone Modulation" (DMT), "Orthogonal Frequency Division Multiplex" (OFDM) or "Discrete Wavelet Multitone" (DWMT), the modeling of the nonlinearities is effected in the frequency domain of a signal, while the nonlinear echo cancellation is effected in the time domain of the signal.

A pilot tone is used for adaptation of the nonlinear modeling. The nonlinearities of the transmission system, in particular of the line driver, cause harmonics, i.e. frequencies at even-numbered multiples of the fundamental frequency occur. Furthermore, said fundamental frequency is altered in magnitude and phase via the linear echo path.

In the frequency domain of the signal, the modeling of nonlinearities is composed of a linear part and a nonlinear part, the linear part, since only the pilot tone is used, being reduced to complex number a1 (magnitude and phase), or, since two linear models are necessary, to two complex numbers a1 and a2. The nonlinear model is described by the dependence of fundamental relative to the respective harmonics.

The adaptation is effected by means of an error signal composed of the difference between the received signal and the estimated echo. In this case, firstly the linear model and then the nonlinear model are adapted. The nonlinear model can be approximated by a Taylor series. In this case the Taylor series is preferably terminated after the, quadratic element.

The coefficients of the nonlinear model are then transferred to the nonlinear time model.

DETAILED DESCRIPTION

Figure 1:
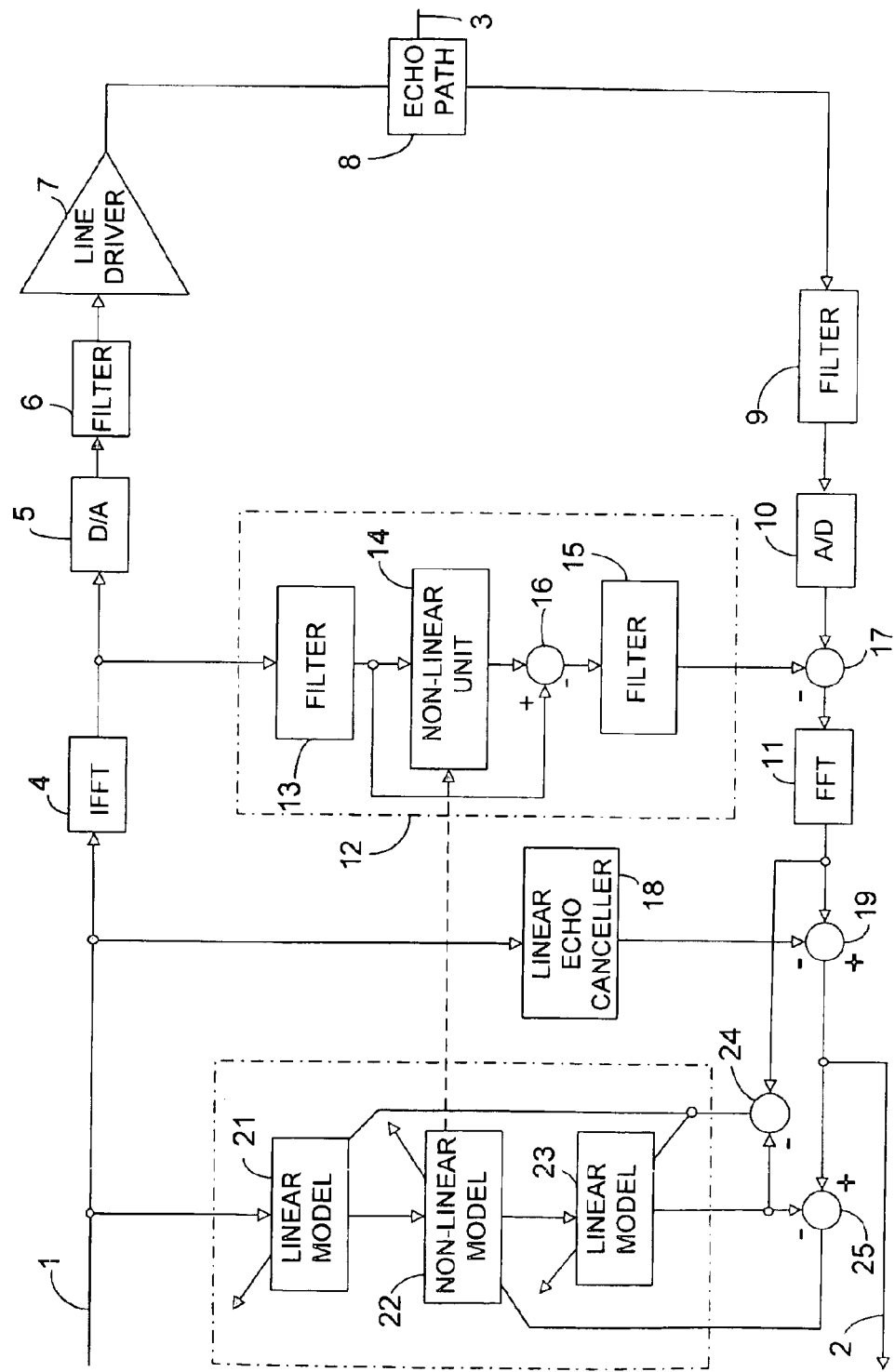
FIG. 1 shows a circuit diagram of echo cancellation according to the invention.

Via a digital reception path 1, the signal passes via an IFFT 4 (Inverse Fast Fourier Transformation), a D/A converter 5, a filter 6, a line driver 7 into the hybrid or echo path 8 and onto an analog transmission/reception path 3. A received analog signal passes via a filter 9, an A/D converter 10, an FFT 11 (Fast Fourier Transformation) onto the digital transmission path 2.

In the echo path or hybrid 8, an echo of the digital transmission signal passes into the reception path of the digital transmission signal, is added to the analog reception signal and therefore leads to interference.

For cancellation of the echo signal, a nonlinear echo canceler 12 comprising a first filter 13, a nonlinear unit 14 and a second filter 15 is provided in the time domain, i.e. downstream of the IFFT 4 and upstream of the FFT 11, of the circuit arrangement. Furthermore, the nonlinear echo canceler 12 has an adder 16, in which the signal downstream of the first filter 13 is subtracted from the signal downstream of she nonlinear unit 14. The cancellation signal, i.e. the estimated echo, is subtracted from the analog signal comprising the reception signal and the echo in a further adder 17.

Furthermore, the circuit has a linear echo canceler 18 in the frequency domain, i.e. upstream of the IFFT 4 and downstream of the FFT 11, whose estimated echo signal is subtracted, in an adder 19, from the digitized signal comprising the reception signal without the nonlinear echo component.

For adaptation of the nonlinear echo canceler 12, the circuit has a device 20 for adaptation of the nonlinearities, which comprises a first linear model 21, a nonlinear model 22 and a second linear model 23, the pilot tone being fed to the device 20. The first 4 and second linear models 21, 23 are adapted by means of an error signal which, in an adder 24, is composed of the estimated echo and the reception signal with the linear echo component. The nonlinear model is adapted by means of an error signal which, in a further adder 25, is composed of the estimated echo and the reception signal. The coefficients of the nonlinear model 14 are transferred to the nonlinear unit 14 of the nonlinear echo canceler 12.

What is claimed is:

1. A circuit arrangement for two-wire/four-wire conversion in a DMT system, which is connected to a digital reception path, a digital transmission path and also an analog transmission/reception path and which has an echo cancellation device in the time domain, the arrangement having a device for adaptation of the echo cancellation in the frequency domain, wherein the echo cancellation device is nonlinear; and the device for adaptation of the echo cancellation has a first linear model, a nonlinear model and also a second linear model; and the coefficients of the nonlinear model which are determined in the device for adaptation of the echo cancellation can be transferred to a nonlinear unit of the echo cancellation device.

2. The circuit arrangement as claimed in claim 1, wherein the device for adaptation of the echo cancellation carries out the adaptation by means of a pilot tone.

3. The circuit arrangement as claimed in claim 1, wherein the first linear model and the second linear model of the device for adaptation of the echo cancellation are in each case formed by a complex number.

4. The circuit arrangement as claimed in claim 1, wherein the nonlinear model of the device for adaptation of the echo cancellation is formed by a Taylor series.

5. The circuit arrangement as claimed in claim 4, wherein the Taylor series of the nonlinear model is calculated up to the quadratic element.

6. The circuit arrangement as claimed in claim 1, wherein a linear echo cancellation device in the frequency domain is connected in parallel with the device for adaptation of the echo cancellation.

7. A method for attenuating echo signals in a circuit arrangement for two-wire/four-wire conversion of a signal generated by multicarrier modulation with orthogonal subchannels, the modeling being effected in the frequency domain of the signal, while the echo cancellation is effected in the time domain of the signal, wherein the echo cancellation device is nonlinear; and the device for adaptation of the echo cancellation has a first linear model, a nonlinear model and also a second linear model; and the coefficients of the nonlinear model which are determined in the device for adaptation of the echo cancellation are transferred to a nonlinear unit of the echo cancellation device.

8. The method as claimed in claim 7, wherein the modeling of the nonlinearities is effected using a pilot tone.

9. The method as claimed in claim 7, wherein the nonlinearities are mapped by a Taylor series.

10. The method as claimed in claim 9, wherein the Taylor series is terminated after the quadratic element.

11. The method as claimed in claim 7, wherein linear echo compensation is carried out in the frequency domain of the signal.

12. A circuit arrangement for echo cancellation in a DMT system, the circuit arrangement comprising:

a nonlinear device for adaptive echo cancellation in the frequency domain, the nonlinear device being connected between a digital reception path and a digital transmission path of the DMT system and having first and second linear models, and a nonlinear model configured to determine coefficients for adaptive echo cancellation; and an echo-cancellation device having a nonlinear unit in communication with the nonlinear model of the nonlinear device for receiving the coefficients therefrom.

13. The circuit arrangement as claimed in claim 12, wherein the nonlinear device further comprises an input for receiving a pilot tone.

14. The circuit arrangement as claimed in claim 12, wherein the first linear model and the second linear model of the nonlinear device are configured to generate signals representative of first and second complex numbers.

15. The circuit arrangement as claimed in claim 12, wherein the nonlinear model of the nonlinear device is configured to generate a signal by evaluating a Taylor series.

16. The circuit arrangement as claimed in claim 15, wherein the nonlinear model of the nonlinear device is configured to generate a signal by evaluating a Taylor series truncated after a quadratic term thereof.

17. The circuit arrangement as claimed in claim 12, further comprising a linear echo cancellation device in the frequency domain connected between the digital transmission path and the digital reception path of the DMT system.

18. A method for attenuating an echo of a signal generated by multicarrier modulation with orthogonal subchannels, said method comprising:

in the frequency domain of the signal, adaptively generating a nonlinear model of the signal by receiving a pilot tone; and on the basis of the nonlinear model, performing nonlinear echo cancellation of the signal in the time domain of the signal.

19. The method as claimed in claim 18, wherein adaptively generating a nonlinear model comprises evaluating a Taylor series.

20. The method as claimed in claim 19, wherein evaluating the Taylor series comprises evaluating the Taylor series truncated after a quadratic term thereof.

21. The method as claimed in claim 18, further comprising performing linear echo compensation in the frequency domain of the signal.

* * * * *